Patented Nov. 26, 1946

2,411,655

UNITED STATES PATENT OFFICE 2,411,655

PROCESS FOR CONDENSATION PRODUCTS OF THIOUREA COMPOUNDS

Charles Graenacher, Riehen, and Richard Sallmann, Gelterkinden, Switzerland, assignors to Society of Chemical Industry in Basle, Basel, Switzerland, a Swiss company No Drawing. Original application January 19, 1939, Serial No. 251,850. Divided and this application July 14, 1943, Serial No. 494,732. In Switzerland January 22, 1938

5 Claims. (Cl. 260—402.5)

According to the present invention new condensation products are obtained by reacting a thiourea compound containing the group

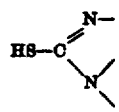

with a member of the group consisting of methylol compounds of amides, ureas and urethanes, each member containing at the most 13 carbon atoms at least 7 of which being connected.

As thiourea compound containing the group

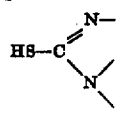

may be used thiourea, N-methyl-, N:N'-dimethyl-, N:N:N'-trimethylthiourea, N-monoethylthiourea, N-phenylthiourea, N:N'-diethylthiourea, potassium, N-phenylthiourea-parasulfonate, N:N'-diethyl-N-hydroxy-thiourea $(C_2H_5—NH—CS—N(C_2H_5)OH)$ monothiobiuret $(NH_2—CO—NH—CS—NH_2)$, thio-allophanic acid methyl ester

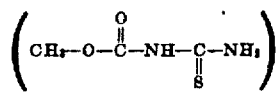

or the like.

Quite generally may be used thiourea compounds of the formula

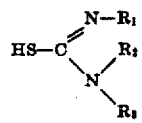

wherein $R_1$, $R_2$ and $R_3$ represent alkyl, aryl, aralkyl radicals, substituted alkyl radicals or alkyl radicals interrupted by other atoms such as O, S, N or substituted aryl radicals. These products of the indicated formula

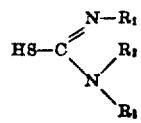

are also designated as "pseudo-thioureas." A radical such as

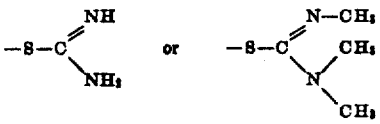

is therefore designated in the present specification as "a radical of a pseudo-thiourea compound."

As carboxylic acid methylolamides there may be used, for instance, the methylolamides of capyrlic, capric, lauric benzoic, toluic, parahexylbenzoic, hexahydrobenzoic acid. These N-methylolcarboxylic acid amides, insofar as they have not been described, are accessible without further information by processes analogous to those that are known.

As methylol compounds of urethanes there may be used, for instance, the N-methylol compounds obtainable from the urethanes corresponding with the aliphatic alcohols having 3 to 13 carbon atoms by treatment with formaldehyde in the usual manner.

The ureamethylol compounds which may be used as parent materials may also be made by processes analogous to those known and without further information from the corresponding ureas, for example hexyl- or octyl-urea.

The reaction between the cited formaldehyde derivatives and the thiourea compounds containing an

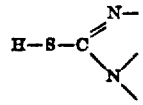

group may be effected by mixing the components at room temperature or at a raised temperature, for example 50 to 100° C., preferably in the presence of a solvent, for instance benzene, chloroform, carbon tetrachloride or glacial acetic acid. When a methylol compound such as a carboxylic acid-N-methylolamide is subjected to the reaction it is frequently advantageous to use a strong acid, for instance hydrochloric acid, as a condensing agent, if desired together with a diluent.

According to the present process there are generally obtained salts of products containing at least seven connected carbon atoms and corresponding to the general formula

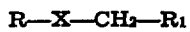

wherein R stands for an organic radical free from water-solubilizing groups and containing at the most 12 carbon atoms, X stands for a bridge in which the sum of the atomic weights of the atoms connecting $CH_2$ with R in a straight chain is 26, the straight chain containing the same atom at the most once, and wherein $R_1$ stands for the radical of a pseudo-thiourea compound the sulfur atom of which is bound to the $CH_2$-group, the latter being linked to such an atom of the bridge X the atomic weight of which amounts to at least 14, which salts are liquid to solid substances soluble in water to form solutions which are decomposed by boiling or when treated with alkalies, water-insoluble compounds being formed. As salts there come into consideration particularly the salts formed with mineral acids, such as hydrohalic acids, for example hydrochloric acid, hydrobromic acid, sulfuric acid, further the salts formed with organic acids, such as formic acid, or acetic acid. An example of such a salt is the product of the formula

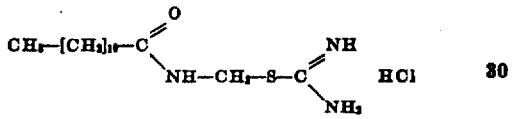

wherein the acid is bound by the pseudo-thiourea radical.

The condensation products obtainable by the invention are, in the form of the salts which they form with acids, soluble in water. The stability of the solutions thus obtained may be increased by the addition of certain auxiliary substances, for instance thioureas, ureas, capillary cation active products. As an example of the last named auxiliary products may be cited the acetate of oleyldiethylamino-ethylamide as well as the μ-heptadecyl - N-methyl-N'-ethylbenzimidazolium chloride. These solutions, whether they contain additional materials or not, have the property that when they are heated or treated with alkalies they decompose, insoluble bodies being precipitated. When this happens on a substratum, for instance a textile, this insoluble body is precipitated in an adherent form. It may, according to its nature, impart to the fiber valuable properties. As further characteristics which may be imparted to the fiber there may be named the stability to creasing and to shifting of the warp and weft, the diminution of lustre, the increase of resistance to water, the prevention of shrinkage in the fabric and in the case of wool the prevention of felting.

By a suitable choice of the parent material the products of the invention may be useful as wetting, emulsifying, foam-producing, levelling, softening agents and as agents enhancing the fastness of dyeings to water, also as disinfectants or preservatives. For these purposes products are especially suitable which contain an aliphatic radical having about 12 carbon atoms.

The products of the invention may be used alone or, as already stated, in conjunction with other substances. Apart from the above-named auxiliaries (thioureas, ureas, capillary active cation products) there may be used for example salts, especially those of weak acids, for example sodium acetate, ammonium acetate, aluminium formate, aluminium acetate, ammonium sulfocyanide, also solvents, hydrocarbons such as paraffin, wax, soaps, soap-like substances, protective colloids, dressing agents, loading materials, softening agents, matting agents or the like.

The following examples illustrate the invention, the parts being by weight:

Example 1

4.6 parts of lauric acid methylolamide and 3 parts of thiourea are dissolved together in 40 parts by volume of hot alcohol. After cooling to 50° C. there are added while stirring 4 parts by volume of alcoholic hydrochloric acid of 25 per cent. strength, and the whole is heated for 20 minutes at 50–55° C. A sample would then be found to be clearly soluble in water with production of much foam. After distilling the alcohol in a vacuum, the product, which probably has the formula

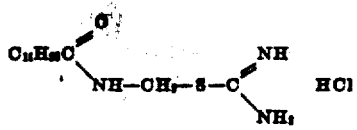

remains in the form of a semi-solid mass which decomposes when boiled in aqueous solution or on addition of alkalies with the formation of a compound insoluble in water.

Example 2

Into 600 parts by volume of absolute alcohol are introduced successively while stirring at 40–50° C., 200 parts of methylol benzamide, 105 parts of thiourea and a concentrated solution of 50 parts of HCl in absolute alcohol. The solution which very soon becomes clear is stirred for 1½ hours at 40–50° C., then overnight at room temperature, and finally for 2 hours while cooling with ice. After filtering and drying, the new condensation product is obtained in the form of a colorless crystalline powder, having probably the formula

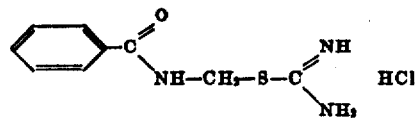

Example 3

2.3 parts of lauric acid methylolamide are dissolved in 25 parts by volume of hot alcohol and after cooling to 50° C. and while stirring, 4 parts of finely powdered N-phenylthiourea are added, followed by 2 parts by volume of alcoholic hydrochloric acid of 20 per cent. strength. After stirring for 10–15 minutes at 40–50° C. a sample is soluble in water. The clear solution is evaporated at 40–50° C. in a vacuum and the condensation product having probably the formula

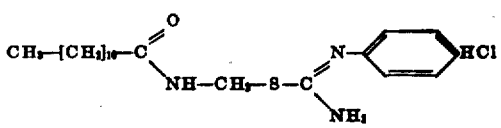

or

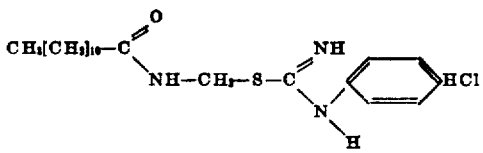

is left in the form of a mass resembling wax.

This application is a division of our application Serial No. 251,850, filed January 19, 1939 (now Patent No. 2,331,387, issued October 12, 1943).

What we claim is:

1. Process for the manufacture of condensation products, which comprises condensing a thiourea compound of the formula

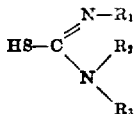

wherein $R_1$, $R_2$ and $R_3$ are members of the group consisting of hydrogen, alkyl, aryl and aralkyl radicals, with a methylol compound of a primary amide, the said methylol compound containing at the most 13 carbon atoms at least 7 of which are connected, in the presence of acids and diluents.

2. Process for the manufacture of condensation products, which comprises condensing a thiourea compound containing the group

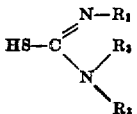

wherein $R_1$, $R_2$ and $R_3$ are members of the group consisting of hydrogen, alkyl, aryl and aralkyl radicals, with a methylol compound of an aliphatic primary amide, the said methylol compound containing at the most 13 carbon atoms at least 7 of which are connected, in the presence of acids and diluents.

3. Process for the manufacture of condensation products, which comprises condensing thiourea with the methylol amide of the formula

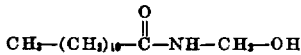

in the presence of acids and diluents.

4. Process for the manufacture of condensation products, which comprises condensing N-phenyl-thiourea with the methylol amide of the formula

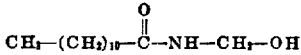

in the presence of acids and diluents.

5. Process for the manufacture of condensation products, which comprises condensing thiourea with the methylol amide of the formula

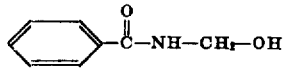

in the presence of acids and diluents.

CHARLES GRAENACHER.
RICHARD SALLMAN.

Certificate of Correction

Patent No. 2,411,655.  November 26, 1946.

CHARLES GRAENACHER ET AL.

It is hereby certified that errors appear in the printed specification of the above numbered patent requiring correction as follows: Column 1, line 21, after "potassium" strike out the comma; column 2, line 14, after "lauric" insert a comma; and that the said Letters Patent should be read with these corrections therein that the same may conform to the record of the case in the Patent Office.

Signed and sealed this 25th day of February, A. D. 1947.

[SEAL]

LESLIE FRAZER,
*First Assistant Commissioner of Patents.*

What we claim is:

1. Process for the manufacture of condensation products, which comprises condensing a thiourea compound of the formula

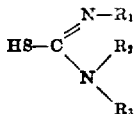

wherein $R_1$, $R_2$ and $R_3$ are members of the group consisting of hydrogen, alkyl, aryl and aralkyl radicals, with a methylol compound of a primary amide, the said methylol compound containing at the most 13 carbon atoms at least 7 of which are connected, in the presence of acids and diluents.

2. Process for the manufacture of condensation products, which comprises condensing a thiourea compound containing the group

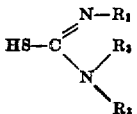

wherein $R_1$, $R_2$ and $R_3$ are members of the group consisting of hydrogen, alkyl, aryl and aralkyl radicals, with a methylol compound of an aliphatic primary amide, the said methylol compound containing at the most 13 carbon atoms at least 7 of which are connected, in the presence of acids and diluents.

3. Process for the manufacture of condensation products, which comprises condensing thiourea with the methylol amide of the formula

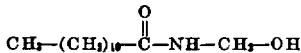

in the presence of acids and diluents.

4. Process for the manufacture of condensation products, which comprises condensing N-phenyl-thiourea with the methylol amide of the formula

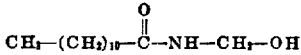

in the presence of acids and diluents.

5. Process for the manufacture of condensation products, which comprises condensing thiourea with the methylol amide of the formula

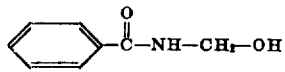

in the presence of acids and diluents.

CHARLES GRAENACHER.
RICHARD SALLMAN.

Certificate of Correction

Patent No. 2,411,655.  November 26, 1946.

CHARLES GRAENACHER ET AL.

It is hereby certified that errors appear in the printed specification of the above numbered patent requiring correction as follows: Column 1, line 21, after "potassium" strike out the comma; column 2, line 14, after "lauric" insert a comma; and that the said Letters Patent should be read with these corrections therein that the same may conform to the record of the case in the Patent Office.

Signed and sealed this 25th day of February, A. D. 1947.

[SEAL]

LESLIE FRAZER,
*First Assistant Commissioner of Patents.*